United States Patent
Hughes et al.

(10) Patent No.: US 11,566,790 B1
(45) Date of Patent: Jan. 31, 2023

(54) METHODS OF OPERATING A TURBOMACHINE COMBUSTOR ON HYDROGEN

(71) Applicant: General Electric Company, Schenectady, NY (US)

(72) Inventors: Michael John Hughes, State College, PA (US); Willy Steve Ziminsky, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/513,066

(22) Filed: Oct. 28, 2021

(51) Int. Cl.
*F23R 3/34* (2006.01)
*F23R 3/36* (2006.01)
*F23R 3/28* (2006.01)

(52) U.S. Cl.
CPC .............. *F23R 3/346* (2013.01); *F23R 3/286* (2013.01); *F23R 3/36* (2013.01)

(58) Field of Classification Search
CPC ............ F23R 3/36; F23R 3/346; F23R 3/286
See application file for complete search history.

(56) References Cited

U.S. PATENT DOCUMENTS

| | | | |
|---|---|---|---|
| 2,930,192 A * | 3/1960 | Johnson | F23R 3/14 60/746 |
| 3,872,664 A * | 3/1975 | Lohmann | F23R 3/14 431/9 |
| 4,062,182 A * | 12/1977 | Fehler | F23R 3/346 60/737 |
| 4,910,957 A * | 3/1990 | Moreno | F23R 3/346 60/737 |
| 4,928,481 A * | 5/1990 | Joshi | F23R 3/346 60/737 |
| 5,193,346 A * | 3/1993 | Kuwata | F23R 3/286 60/737 |
| 5,749,219 A * | 5/1998 | DuBell | F23R 3/346 60/737 |
| 6,047,550 A | 4/2000 | Beebe | |
| 6,192,688 B1 | 2/2001 | Beebe | |
| 6,868,676 B1 * | 3/2005 | Haynes | F23R 3/20 60/776 |
| 6,868,678 B2 | 3/2005 | Mei et al. | |
| 7,886,539 B2 | 2/2011 | Cai | |
| 9,228,499 B2 | 1/2016 | Stryapunin | |
| 11,067,281 B1 * | 7/2021 | Garcia | F23R 3/005 |

(Continued)

*Primary Examiner* — William H Rodriguez
(74) *Attorney, Agent, or Firm* — Dority & Manning, P.A.

(57) ABSTRACT

A method of operating a combustor of a turbomachine on a total fuel input that contains a concentration of hydrogen that is greater than about 80% is provided. The method includes injecting a first mixture of air and a first fuel containing a first amount of hydrogen into the primary combustion zone of the combustor to generate a first flow of combustion gases having a first temperature. The method further includes injecting, with one or more premix injectors disposed downstream of the fuel nozzles, a second mixture of air and a second fuel containing a second amount of hydrogen into the secondary combustion zone of the combustor to generate a second flow of combustion gases having a second temperature. The method further includes separately injecting a third fuel into secondary combustion zone to generate a third flow of combustion gases having a third temperature.

19 Claims, 8 Drawing Sheets

(56) References Cited

U.S. PATENT DOCUMENTS

| | | | |
|---|---|---|---|
| 2007/0271927 A1* | 11/2007 | Myers | F23R 3/346 60/776 |
| 2008/0264033 A1* | 10/2008 | Lacy | F23R 3/346 29/889.22 |
| 2009/0084082 A1 | 4/2009 | Martin et al. | |
| 2010/0071376 A1* | 3/2010 | Wiebe | F23R 3/346 60/740 |
| 2010/0170219 A1* | 7/2010 | Venkataraman | F23R 3/346 60/39.463 |
| 2010/0170252 A1* | 7/2010 | Venkataraman | F23N 1/002 60/742 |
| 2010/0174466 A1* | 7/2010 | Davis, Jr. | F23R 3/34 701/100 |
| 2010/0229557 A1* | 9/2010 | Matsumoto | F23R 3/34 60/737 |
| 2010/0242482 A1* | 9/2010 | Kraemer | F02C 7/228 60/746 |
| 2011/0067402 A1* | 3/2011 | Wiebe | F23R 3/46 60/740 |
| 2011/0179803 A1* | 7/2011 | Berry | F02C 7/222 60/722 |
| 2011/0185735 A1* | 8/2011 | Snyder | F23R 3/346 60/746 |
| 2011/0296839 A1* | 12/2011 | Van Nieuwenhuizen | F23R 3/346 60/737 |
| 2015/0276226 A1 | 10/2015 | Laster et al. | |
| 2015/0285501 A1* | 10/2015 | DiCintio | F23R 3/14 60/740 |
| 2015/0285504 A1* | 10/2015 | Melton | B23K 26/702 60/737 |
| 2016/0258629 A1* | 9/2016 | Slobodyanskiy | F23N 5/003 |
| 2017/0176014 A1* | 6/2017 | Hughes | F02C 3/04 |
| 2018/0187893 A1* | 7/2018 | DiCintio | F23R 3/346 |
| 2018/0328588 A1* | 11/2018 | Lemon | F23R 3/286 |
| 2022/0026069 A1* | 1/2022 | Paniharam | F23R 3/34 |

* cited by examiner

METHODS OF OPERATING A TURBOMACHINE COMBUSTOR ON HYDROGEN

FIELD

The present disclosure relates generally to methods of operating a turbomachine combustor on hydrogen. In particular, the present disclosure relates to methods of burning high levels of hydrogen and/or exclusively hydrogen within a gas turbine combustor.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., typically natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

Traditional gas turbine engines include one or more combustors that burn a mixture of natural gas and air within the combustion chamber to generate the high pressure and temperature combustion gases. As a byproduct, oxides of nitrogen (NOx) and other pollutants are created and expelled by the exhaust section. Regulatory requirements for low emissions from gas turbines are continually growing more stringent, and environmental agencies throughout the world are now requiring even lower rates of emissions of NOx and other pollutants from both new and existing gas turbines.

Burning a mixture of natural gas and high amounts of hydrogen and/or burning pure hydrogen instead of natural gas within the combustor would significantly reduce or eliminate the emission of NOx and other pollutants. However, because hydrogen burning characteristics are different than those of natural gas, traditional combustion systems and methods are not capable of burning high levels of hydrogen and/or pure hydrogen without issue. For example, burning high levels of hydrogen and/or pure hydrogen within a traditional combustion system could promote flashback or flame holding conditions in which the combustion flame migrates towards the fuel being supplied by the nozzles, possibly causing severe damage to the nozzles in a relatively short amount of time.

As such, an improved method for burning high levels of hydrogen and/or pure hydrogen within a gas turbine combustor is desired and would be appreciated in the art.

BRIEF DESCRIPTION

Aspects and advantages of the methods in accordance with the present disclosure will be set forth in part in the following description, or may be obvious from the description, or may be learned through practice of the technology.

In accordance with one embodiment, a method of operating a combustor of a turbomachine on a total fuel input that contains a concentration of hydrogen that is greater than about 80% to generate outlet combustion gases having an outlet temperature is provided. The combustor includes a combustion chamber that has a primary combustion zone and a secondary combustion zone. The method includes injecting, with at least one fuel nozzle, a first mixture of air and a first fuel containing hydrogen into the primary combustion zone of the combustor to generate a first flow of combustion gases having a first temperature. The method further includes injecting, with one or more premix injectors disposed downstream of the fuel nozzles, a second mixture of air and a second fuel containing hydrogen into the secondary combustion zone of the combustor as a cross-flow to generate a second flow of combustion gases having a second temperature. The method further includes separately injecting a third fuel into secondary combustion zone. The third fuel ignites and mixes with the first flow and the second flow of combustion gases to generate outlet combustion gases having a third temperature.

In accordance with another embodiments, a method of operating a combustor is provided. The method includes injecting, with at least one fuel nozzle, a first mixture of air and a first fuel into a primary combustion zone of the combustor to generate a first flow of combustion gases having a first temperature. The method further includes injecting, with one or more premix injectors disposed downstream of the fuel nozzles, a second mixture of air and a second fuel into a secondary combustion zone of the combustor as a cross-flow to generate a second flow of combustion gases having a second temperature. The method further includes separately injecting a third fuel into the secondary combustion zone. The third fuel ignites and mixes with the first flow and the second flow of combustion gases to generate outlet combustion gases having a third temperature.

In accordance with yet another embodiment, a method of operating a combustor of a turbomachine on a total fuel input that contains a 100% concentration of hydrogen to generate outlet combustion gases having an outlet temperature is provided. The combustor includes a combustion chamber that has a primary combustion zone and a secondary combustion zone. The method includes injecting, with at least one fuel nozzle, a first mixture of air and hydrogen into the primary combustion zone of the combustor to generate a first flow of combustion gases having a first temperature. The method further includes injecting, with one or more premix injectors disposed downstream of the fuel nozzles, a second mixture of air and hydrogen into the secondary combustion zone of the combustor to generate a second flow of combustion gases having a second temperature. The method further includes separately injecting a flow of pure hydrogen into the combustion chamber of the combustor to generate a third flow of combustion gases having a third temperature.

These and other features, aspects, and advantages of the present methods will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present methods, including the best mode of making and using the present systems and methods, directed to one of ordinary skill in the art, is set forth in the specification, which makes reference to the appended figures, in which.

DETAILED DESCRIPTION

Figure 1:
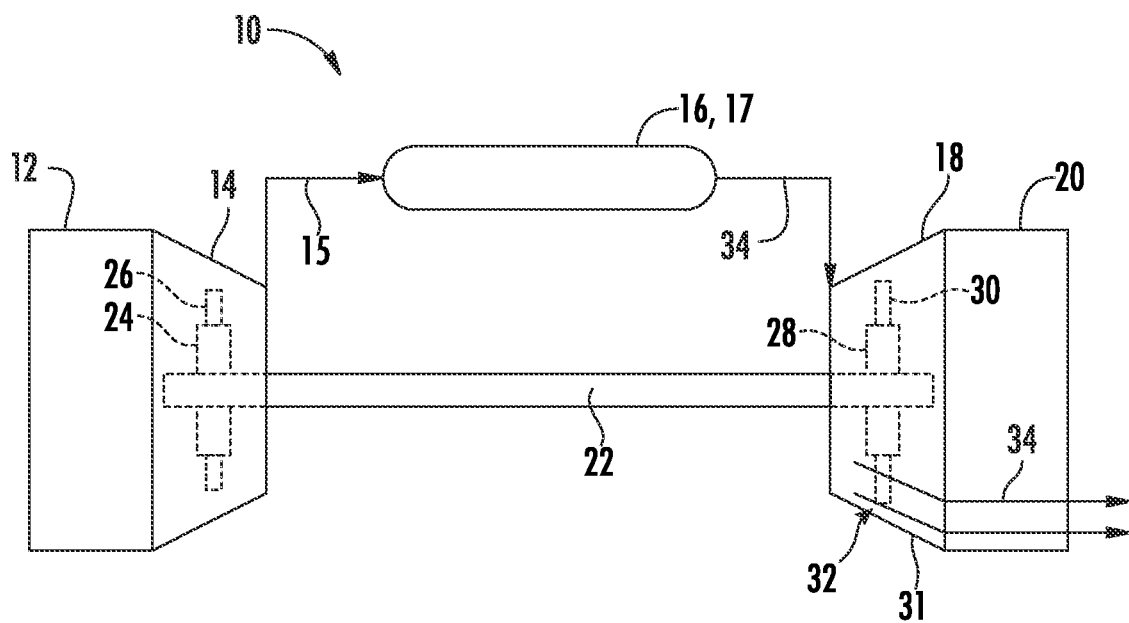
FIG. 1 is a schematic illustration of a turbomachine, in accordance with embodiments of the present disclosure.

Reference now will be made in detail to embodiments of the present methods, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the subject technology. As used herein, the terms "first", "second", and "third" may be used interchangeably to distinguish one component from another and are not intended to signify location or importance of the individual components.

The term "fluid" may refer to a gas or a liquid. The term "fluid communication" means that a fluid is capable of flowing or being conveyed between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component, and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. The terms "directly coupled," "directly fixed," "directly attached to," and the like indicated that a first component is joined to a second component with no intervening structures. As used herein, the terms "comprises," "comprising," "includes," "including," "has," "having" or any other variations thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

Here and throughout the specification and claims, range limitations are identified and include all the sub-ranges contained therein unless context or language indicates otherwise. For example, all ranges disclosed herein are inclusive of the endpoints, and the endpoints are independently combinable with each other.

As used herein, the term "pure hydrogen" may refer to a gas containing almost entirely (or entirely) hydrogen not mixed with air or other oxidants, such as greater than 90% hydrogen with some natural contaminants or 100% hydrogen containing little to no contaminants. Also, as used herein, "pure fuel" may refer to a mixture of fuels in the absence of air or other oxidants, such as hydrogen and natural gas (e.g., 80% hydrogen and 20% natural gas, or such as 70% hydrogen and 30% natural gas, or such as 60% hydrogen and 40% natural gas, or such as 50% hydrogen and 50% natural gas). The natural gas may be ethane, propane, methane, or others. Additionally, as used herein, the term "hydrogen" may refer to diatomic hydrogen ($H_2$), such as hydrogen gas not containing any carbon.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land-based and/or industrial gas turbine unless otherwise specified in the claims. For example, the technology as described herein may be used in any type of turbomachine including but not limited to a steam turbine, an aircraft gas turbine, or a marine gas turbine.

As shown, gas turbine 10 generally includes an inlet section 12, a compressor section 14 disposed downstream of the inlet section 12, a plurality of combustors 17 (shown in FIG. 2) within a combustion section 16 disposed downstream of the compressor section 14, a turbine section 18 disposed downstream of the combustion section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14. The compressor section 14 further includes a plurality of stationary vanes (not shown), which are arranged in stages with the rotor blades 26 and which direct the flow against the rotor blades 26.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18. The turbine section 18 further includes a plurality of stationary vanes (not shown), which are arranged in stages with the rotor blades 30 and which direct the flow against the rotor blades 30.

During operation, a working fluid such as air flows through the inlet section 12 and into the compressor section 14 where the air is progressively compressed by multiple compressor stages of rotating blades and stationary vanes, thus providing pressurized air to the combustors 17 of the combustion section 16. The pressurized air is mixed with fuel and burned within each combustor 17 to produce combustion gases 34. The combustion gases 34 flow through the hot gas path 32 from the combustion section 16 into the turbine section 18, in which energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figure 2:
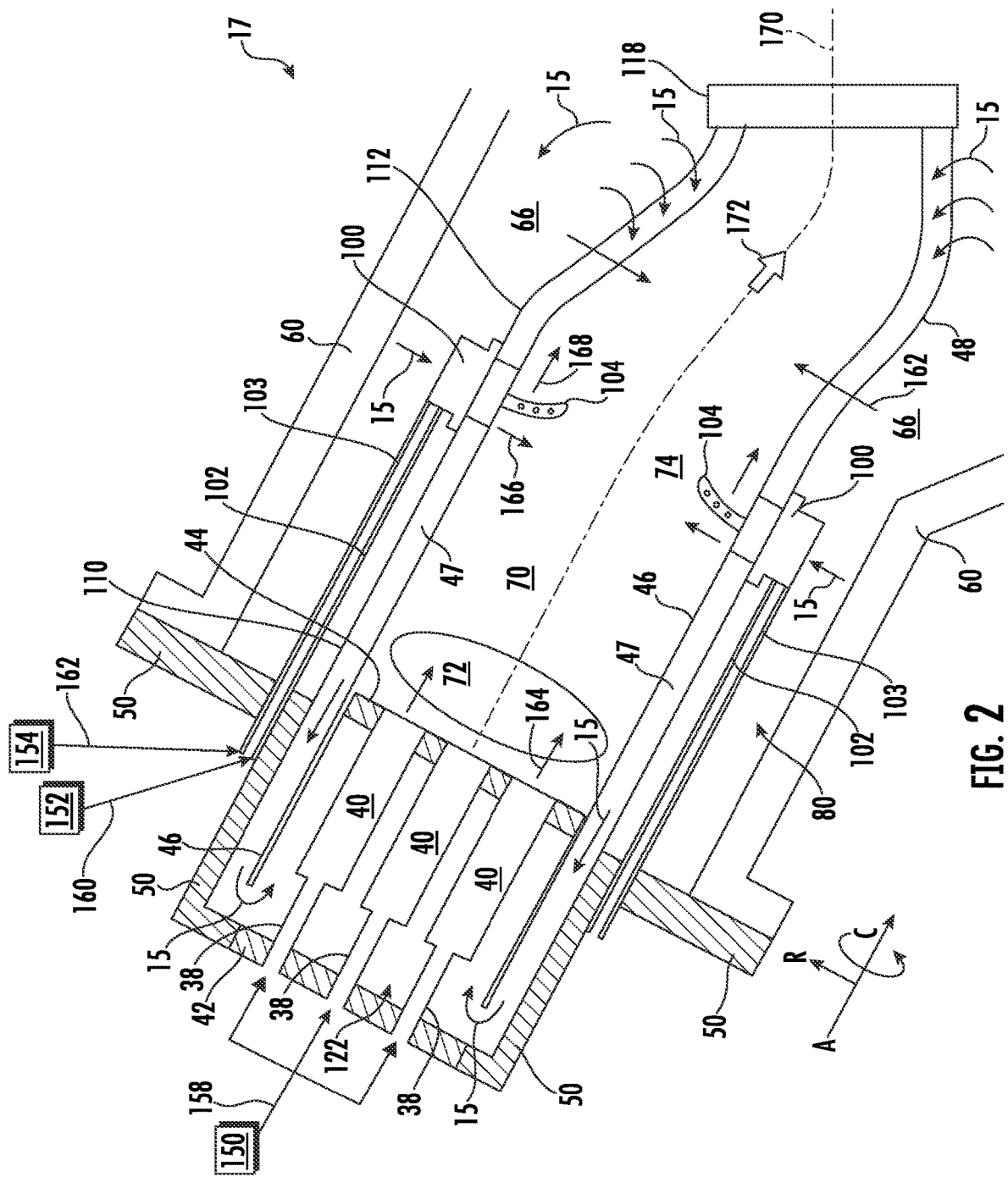
FIG. 2 illustrates a cross-sectional view of a combustor suitable for use in the turbomachine of FIG. 1, in accordance with embodiments of the present disclosure.

FIG. 2 is a schematic representation of a combustor 17, as may be included in a can annular combustion system for the heavy-duty gas turbine 10. In a can annular combustion system, a plurality of combustors 17 (e.g., 8, 10, 12, 14, 16, or more) are positioned in an annular array about the shaft 22 that connects the compressor section 14 to the turbine section 18.

As shown in FIG. 2, the combustor 17 may define an axial direction A that extends along an axial centerline 170. The combustor may also define a circumferential direction C which extends around the axial direction A and the axial centerline 170. The combustor 17 may further define a radial direction R perpendicular to the axial direction A and the axial centerline 170.

FIG. 2 illustrates a combustor 17 having one or more exemplary fuel injection assemblies 80 (also referred to as an axial fuel staging (AFS) system), as discussed further herein. The combustor 17 includes a combustion liner 46 that defines a combustion chamber 70. The combustion liner 46 may be positioned within (i.e., circumferentially surrounded by) an outer sleeve 48, such that an annulus 47 is formed therebetween. At least one fuel nozzle 40 may be positioned at the forward end of the combustor 17. Fuel may be directed through first fuel supply conduits 38, which extend through an end cover 42, and into the fuel nozzles 40. The fuel nozzles 40 convey the fuel and compressed air 15 into a primary combustion zone 72, where combustion occurs. In some embodiments, the fuel and compressed air 15 are combined as a mixture prior to reaching the primary combustion zone 72.

The combustion liner 46 may contain and convey combustion gases to the turbine section 18. The combustion liner 46 defines the combustion chamber 70 within which combustion occurs. As shown in FIG. 2, the combustion liner 46 may extend between the fuel nozzles 40 and an aft frame 118. The combustion liner 46 may have a cylindrical liner portion and a tapered transition portion that is separate from the cylindrical liner portion, as in many conventional combustion systems. Alternately, the combustion liner 46 may have a unified body (or "unibody") construction, in which the cylindrical portion and the tapered portion are integrated with one another. Thus, any discussion of the combustion liner 46 herein is intended to encompass both conventional combustion systems having a separate liner and transition piece and those combustion systems having a unibody liner. Moreover, the present disclosure is equally applicable to those combustion systems in which the transition piece and the stage one nozzle of the turbine section 18 are integrated into a single unit, sometimes referred to as a "transition nozzle" or an "integrated exit piece."

The combustion liner 46 may be surrounded by an outer sleeve 48, which is spaced radially outward of the combustion liner 46 to define an annulus 47 through which compressed air 15 flows to a head end of the combustor 17. Heat is transferred convectively from the combustion liner 46 to the compressed air 15, thus cooling the combustion liner 46 and warming the compressed air 15.

In exemplary embodiments, the outer sleeve 48 may include a flow sleeve 110 at the forward end and an impingement sleeve 112 at the aft end. The flow sleeve 110 and the impingement sleeve 112 may be coupled to one another. Alternately, the outer sleeve 48 may have a unified body (or "unisleeve") construction, in which the flow sleeve 110 and the impingement sleeve 112 are integrated with one another in the axial direction. As before, any discussion of the outer sleeve 48 herein is intended to encompass both conventional combustion systems having a separate flow sleeve 110 and impingement sleeve 112 and combustion systems having a unisleeve outer sleeve.

The forward casing 50 and the end cover 42 of the combustor 17 define the head end air plenum 122, which includes one or more fuel nozzles 40. The fuel nozzles 40 may be any type of fuel nozzle, such as bundled tube fuel nozzles 200 (FIG. 3, often referred to as "micromixers") or swirler nozzles (often referred to as "swozzles"). For example, the fuel nozzles 40 are positioned within the head end air plenum 122 defined at least partially by the forward casing 50. In many embodiments, the fuel nozzles 40 may extend from the end cover 42. For example, each fuel nozzle 40 may be coupled to an aft surface of the end cover 42 via a flange (not shown). As shown in FIG. 2, the at least one fuel nozzle 40 may be partially surrounded by the combustion liner 46. The aft, or downstream ends, of the fuel nozzles 40 extend through a cap plate 44 that defines the upstream end of the combustion chamber 70.

The fuel nozzles 40 may be in fluid communication with a first fuel supply 150 configured to supply a first fuel 158 to the fuel nozzles 40. In many embodiments, the first fuel 158 may be a fuel mixture containing natural gas (such as methane, ethane, propane, or other suitable natural gas) and hydrogen. In other embodiments, the first fuel 158 may be pure natural gas or pure hydrogen (e.g., 100% hydrogen, which may or may not contain some amount of contaminants), such that the first fuel is not a mixture of multiple fuels.

In exemplary embodiments, the first fuel 158 and compressed air 15 may mix together within the fuel nozzles 40 to form a first mixture of compressed air 15 and the first fuel 158 before being ejected (or injected) by the fuel nozzles 40 into the primary combustion zone 72. The first mixture of the first fuel 158 and compressed air 15 may be injected into the primary combustion zone 72 and ignited to generate a first flow of combustion gases 164 having a first temperature.

As discussed below, during operation of the combustor 17 on a total fuel input that comprises a high amount of hydrogen (e.g., greater than about 80%), the temperature of combustion gases within the primary combustion zone 72 (e.g., the first flow of combustion gases 164) may be the lowest temperature of any of any combustion gases within the combustion chamber 70 (e.g., lower than the combustion gases within the secondary combustion zone 74). Operated in this way, the temperature of combustion gases within the primary combustion zone 72 may be a lower temperature than combustion gases in the secondary combustion zone 74, which may advantageously enable the combustor 17 to operate on high amounts of hydrogen without creating potentially damaging flame holding and/or flashback conditions.

The forward casing 50 may be fluidly and mechanically connected to a compressor discharge casing 60, which defines a high pressure plenum 66 around the combustion liner 46 and the outer sleeve 48. Compressed air 15 from the compressor section 14 travels through the high pressure plenum 66 and enters the combustor 17 via apertures (not shown) in the downstream end of the outer sleeve 48 (as indicated by arrows near an aft frame 118). Compressed air travels upstream through the annulus 47 and is turned by the end cover 42 to enter the fuel nozzles 40 and to cool the head end. In particular, compressed air 15 flows from high pressure plenum 66 into the annulus 47 at an aft end of the combustor 17, via openings defined in the outer sleeve 48. The compressed air 15 travels upstream from the aft end of the combustor 17 to the head end air plenum 122, where the compressed air 15 reverses direction and enters the fuel nozzles 40.

In the exemplary embodiment, a fuel injection assembly 80 is provided to deliver a second fuel/air mixture and/or a flow of pure fuel (e.g., 100% fuel, such as hydrogen, not mixed with air) to a secondary combustion zone 74. For example, a second flow of fuel and air may be introduced by one or more premix injectors 100 to the secondary combustion zone 74, and a flow of supplemental fuel may be introduced by one or more supplemental or immersed injectors 104.

The primary combustion zone 72 and the secondary combustion zone 74 may each be portions of the combustion chamber 70 and therefore may be defined by the combustion liner 46. For example, the primary combustion zone 72 may be defined from an outlet of the fuel nozzles 40 to the premix injector 100, and the secondary combustion zone may be defined from the premix injector 100 to the aft frame 118. In this arrangement, the forward most boundary of the premix injector 100 may define the end of the primary combustion zone 72 and the beginning of the secondary combustion zone 74 (e.g., at an axial location where a second flow of fuel and air are introduced).

Such a combustion system having axially separated combustion zones is described as an "axial fuel staging" (AFS) system. The fuel injection assemblies 80 may be circumferentially spaced apart from one another on the outer sleeve 48 (e.g., equally spaced apart in some embodiments). In many embodiments, the combustor 17 may include four fuel injection assemblies 80 spaced apart from one another and configured to inject a second mixture of fuel and air into a secondary combustion zone 74 via the premix injector 100 and configured to inject a flow of pure fuel (e.g., a fuel mixture or pure hydrogen) via the immersed injector 104, in order to increase the combustion gases 34 and temperature thereof. In other embodiments, the combustor 17 may include any number of fuel injection assemblies 80 (e.g., 1, 2, 3, or up to 10).

As shown in FIG. 2, each fuel injection assembly 80 may include a premix injector 100, an immersed injector 104, a second fuel supply conduit 102 that supplies a second fuel (such as pure hydrogen or a natural gas and hydrogen mixture comprising greater than 80% hydrogen) to the premix injector 100, and a third fuel supply conduit 103 that supplies a pure fuel (e.g., a fuel mixture or pure hydrogen) to the immersed injector 104. For example, each premix injector 100 may be in fluid communication, at least partially via the second fuel supply conduit 102, with a second fuel supply 152 configured to supply a second fuel 160 to each premix injector 100. In many embodiments, the second fuel 160 may be a fuel mixture containing natural gas (such as methane, ethane, propane, or other suitable natural gas) and hydrogen. In other embodiments, the second fuel 160 may be pure natural gas or pure hydrogen (e.g., 100% hydrogen), such that the second fuel includes no other fuels mixed therein. Similarly, each immersed injector 104 may be in fluid communication, at least partially via the third fuel supply conduit 103, with a third fuel supply 154 configured to supply a third fuel 162 to each immersed injector 104. In exemplary embodiments, the third fuel 162 may be pure fuel (e.g., a fuel mixture or pure hydrogen), such that the third fuel includes no other fuels or air mixed therein.

Because the fuel nozzles 40, the premix injectors 100, and the immersed injectors 104 are separately fueled (e.g., via the fuel supplies 150, 152, and 154), they may allow the combustor a wide range of operational flexibility. For example, each of the fuel nozzles 40, the premix injectors 100, and the immersed injectors 104 may be supplied with a different fuel or fuel mixture. Particularly, in exemplary embodiments, each of the fuel nozzles 40, the premix injectors 100, and the immersed injectors 104 may be supplied pure hydrogen or a fuel mixture that contains mostly hydrogen (e.g., greater than 80% hydrogen) and natural gas (such as methane, ethane, propane, or other natural gas). However, it should be appreciated that, in some embodiments, each of the fuel nozzles 40, the premix injectors 100, and the immersed injectors 104 may be fueled by the same fuel supply, such that the same fuel mixture or pure fuel is supplied to all of the fuel nozzles 40, the premix injectors 100, and the immersed injectors 104.

As used herein, the term "premix" may be used to describe a component, passage, or cavity in which fuel and air are mixed together prior to being injected into the combustion chamber 70. In many embodiments, each premix injector 100 may fluidly couple the high pressure plenum 66 to the secondary combustion zone 74. For example, compressed air 15 from the high pressure plenum 66 may enter the premix injector 100 where it is mixed with the second fuel 160 prior to being injected into the secondary combustion zone 74. For example, in exemplary embodiments, each premix injector 100 may extend through the outer sleeve 48, the annulus 47, and the combustion liner 46 and into the secondary combustion zone 74. Specifically, the premix injectors 100 may each extend radially from the high pressure plenum 66, through the outer sleeve 48, the annulus 47, and the combustion liner 46, such that the premix injector 100 is capable of delivering a second flow of fuel and air to the secondary combustion zone 74. The premix injectors 100 may be coupled to the combustion liner 46 and/or the outer sleeve 48, such that each premix injector 100 introduces the second fuel/air mixture as a jet entering a cross-flow (such as at an angle, oblique, orthogonal, slantwise, diagonally, transverse, or nonparallel) of the combustion products 164 produced in the primary combustion zone 72. The second fuel/air mixture(s) are ignited by the combustion products 164 from the primary combustion zone 72 and burn in the secondary combustion zone 74.

The premix injector 100 may be coupled to the outer sleeve 48 and may extend through the outer sleeve 48 and the combustion liner 46. In one embodiment, a boss (not shown) supporting the premix injector 100 functions as a fastener for securing the outer sleeve 48 to the combustion liner 46. In other embodiments, the premix injector 100 may be coupled to the outer sleeve 48 in any suitable manner, and the outer sleeve 48 may have any suitable number of components coupled between the flange of the forward casing 50 and the turbine nozzle in any suitable manner that permits the fuel injection assembly 80 to function as described herein.

In exemplary embodiments, the second fuel 160 and compressed air 15 may mix together within the premix injectors 100 to form a second mixture of compressed air 15 and the second fuel 160 before being ejected (or injected) by the premix injectors 100 into the secondary combustion zone 74. The second mixture of the second fuel 160 and compressed air 15 may be injected (e.g., as a cross-flow, such as generally radially) into the secondary combustion zone 74 and ignited to generate a second flow of combustion gases 166 having a second temperature.

The immersed injector 104 may extend radially through the premix injector (e.g., through the center of the premix injector 100) and into the secondary combustion zone 74. For example, the immersed injector 104 may extend radially into the secondary combustion zone 74 of the combustion chamber 70, such that the immersed injector 104 is directly exposed to combustion gases during operation of the combustor 17. As described above, although the immersed injector extends through the premix injector 100, the immersed injector 104 may be fluidly isolated from the premix injector 100. In this arrangement, the immersed injector 104 may separately inject a flow of third fuel 162 (e.g., a fuel mixture, such as hydrogen and natural gas, or entirely fuel, such as pure hydrogen not mixed with air or other oxidants) directly into the secondary combustion zone 74 to generate a third flow of combustion gases 168. In this way, the third fuel 162 may be introduced by the immersed injector 104 (or supplemental injector) as a supplemental fuel that generates additional combustion gases 34 proximate the exit of the combustion chamber 70 (e.g., closer to the aft frame 118 than the end cover 42), which may advantageously allow the combustor 17 to generate outlet combustion gases 172 having an outlet temperature without any potentially dangerous flashback or flame holding events. As should be appreciated, the third fuel 162 may be airless (or oxidant-less), such that no air or other oxidants are mixed therein. In this way, the third fuel 162 may be a pure fuel or pure hydrogen. In exemplary implementations, the first flow of combustion gases 164, the second flow of combustion gases 166, and the third flow of combustion gases 168 may mix together within the secondary combustion zone 74 to form outlet combustion gases 172 (34 in FIG. 1) having an outlet temperature. The outlet combustion gases 172 may exit the combustor 17 via the aft frame 118 and enter the turbine section 18 of the gas turbine 10.

Although the immersed injector 104 in FIG. 2 extends radially through the premix injector 100 and into the secondary combustion zone 74, it should be understood that the immersed injector 104 may be axially spaced apart and disposed downstream from the premix injector 100 with respect to the flow of combustion gases. For example, the immersed injector 104 may be disposed axially between the premix injector 100 and the aft frame 118 with respect to the axial centerline 170. In such embodiments, the immersed injector 104 may extend independently through the outer sleeve 48, the annulus 47, the combustion liner 46, and into the secondary combustion zone 74.

During operation of the combustor 17 on a total fuel input that comprises a high amount of hydrogen (e.g., greater than about 80%), the temperature of combustion gases within the secondary combustion zone (e.g., outlet combustion gases 172) may be the highest temperature of any of any combustion gases within the combustion chamber. Specifically, the temperature of combustion gases 166, 168 within the secondary combustion zone 74 may be a higher temperature than combustion gases 164 in the primary combustion zone 72, which may advantageously enable the combustor 17 to operate on high amounts of hydrogen (or entirely on hydrogen) without experiencing potentially damaging flame holding and/or flashback conditions.

Figure 3:
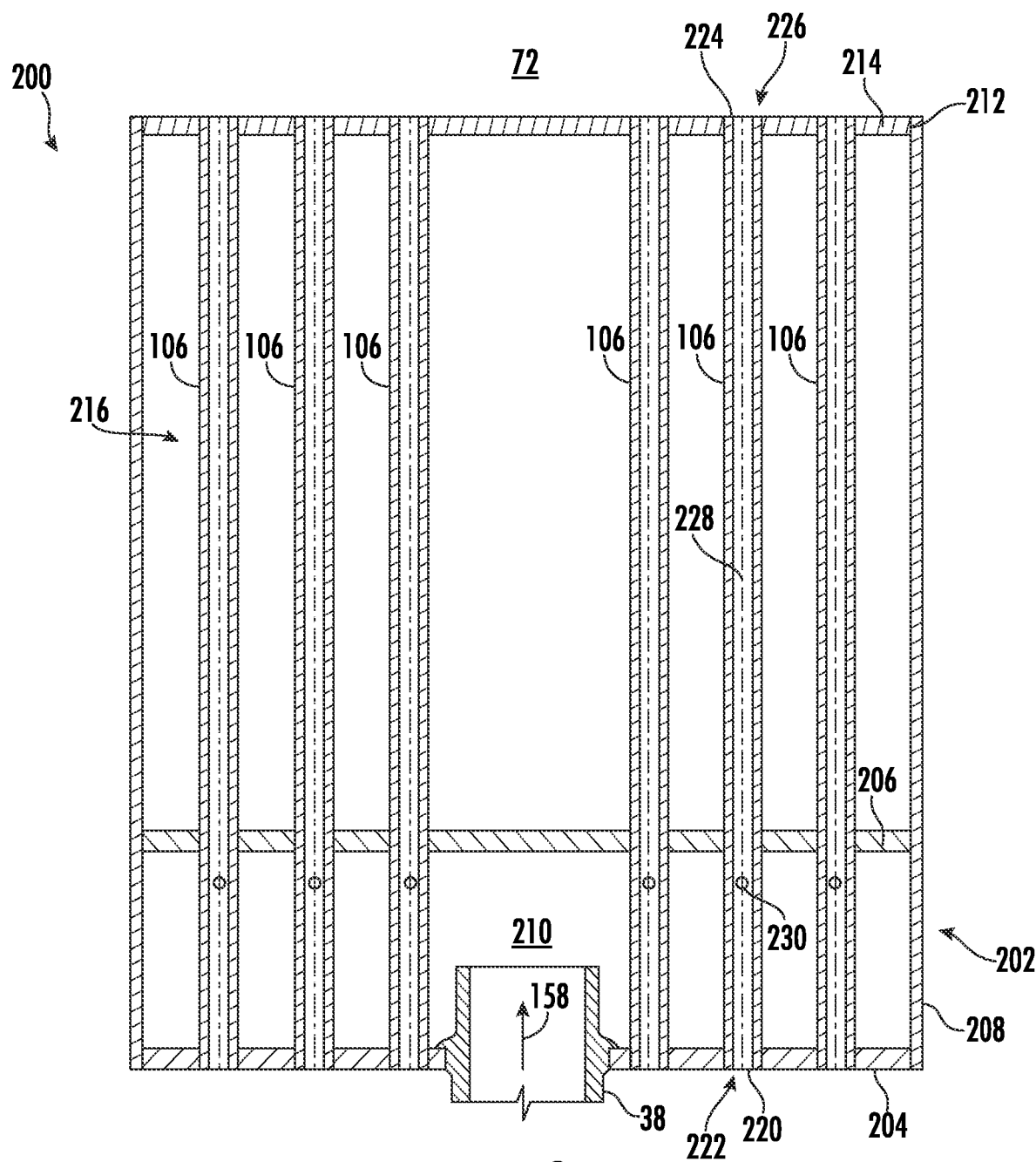
FIG. 3 illustrates a bundled tube fuel nozzle suitable for use in the combustor of FIG. 2, in accordance with embodiments of the present disclosure.

FIG. 3 provides a cross-sectional side view of a portion of a bundled tube fuel nozzle 200. In exemplary embodiments, the one or more fuel nozzles 40 shown in FIG. 2 may each be a bundled tube fuel nozzle 200. As shown in FIG. 3, the bundled tube fuel nozzle 200 includes a fuel plenum body 202 having a forward or upstream plate 204, an aft plate 206 axially spaced from the forward plate 204 and an outer band or shroud 208 that extends axially between the forward plate 204 and the aft plate 206. A fuel plenum 210 is defined within the fuel plenum body 202. In particular embodiments, the forward plate 204, the aft plate 206 and the outer band 208 may at least partially define the fuel plenum 210. In particular embodiments, the fuel supply conduit 38 may extend through the forward plate 204 to provide fuel (such as pure hydrogen or a fuel mixture comprising greater than 80% hydrogen) to the fuel plenum 210. In various embodiments, the bundled tube fuel nozzle 200 includes a cap plate 212 axially spaced from the aft plate 206. A hot side 214 of the cap plate 212 is generally disposed adjacent or proximate to the primary combustion zone 72. The cap plate 212 may be unique to each bundled tube fuel nozzle 200 or may be common among all the bundled tube fuel nozzles 200 (e.g., such as the cap plate 44 shown in FIG. 2).

As shown in FIG. 3, the bundled tube fuel nozzle 200 may include a tube bundle 216 comprising a plurality of premix tubes 106. Each premix tube 106 may extend through the forward plate 204, the fuel plenum 210, the aft plate 206, and the cap plate 212. The premix tubes 106 are fixedly connected to and/or form a seal against the aft plate 206. For example, the premix tubes 106 may be welded, brazed or otherwise connected to the aft plate 206. Each premix tube 106 includes an inlet 220 defined at an upstream end 222 of each respective tube 106 and an outlet 224 defined at a downstream end 226 of each respective tube 106. Compressed air from the head end 122 may enter each of the premix tubes 106 at the inlet and may be mixed with fuel before being expelled into the primary combustion zone. For example, each premix tube 106 defines a respective premix flow passage 228 through the bundled tube fuel nozzle 200, in which fuel (such as pure hydrogen or a fuel mixture comprising greater than 80% hydrogen) may be mixed with compressed air. In particular embodiments, one or more premix tubes 106 of the plurality of tubes 106 is in fluid communication with the fuel plenum 210 via one or more fuel ports 230 defined within the respective premix tube(s) 106.

Figure 4:
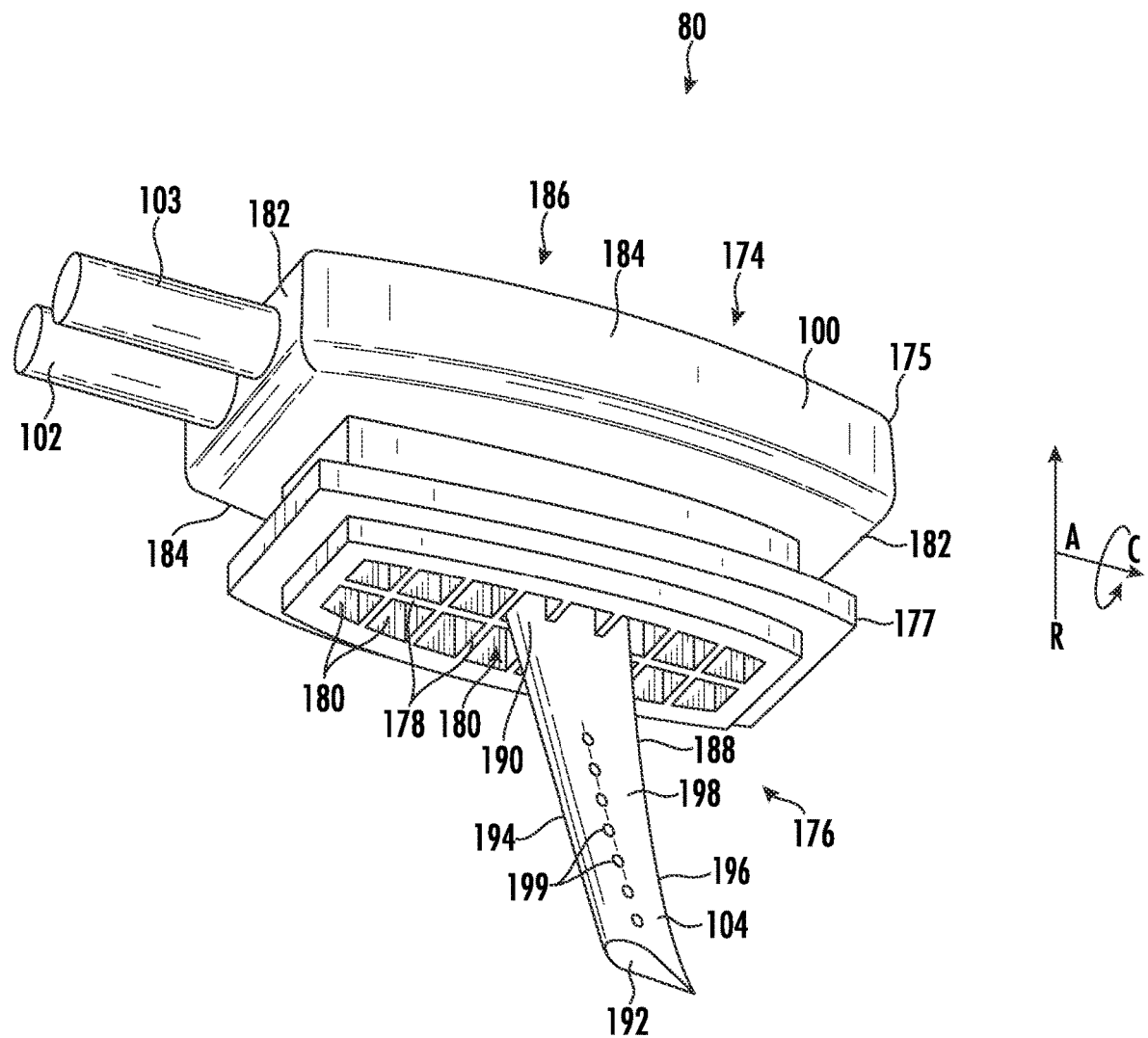
FIG. 4 illustrates a fuel injection assembly suitable for use in the combustor of FIG. 2, in accordance with embodiments of the present disclosure.

FIG. 4 illustrates an enlarged perspective view of a fuel injection assembly 80, in accordance with embodiments of the present disclosure. As shown the fuel injection assembly 80 may include a premix injector 100, an immersed injector 104, a second fuel supply conduit 102 that supplies a second fuel to the premix injector 100, and a third fuel supply conduit 103 that supplies a third fuel to the immersed injector 104. The second fuel and the third fuel may be pure (i.e., unmixed) hydrogen or a mixture of natural gas and hydrogen with greater than 80% hydrogen (e.g., diatomic hydrogen gas). The second fuel and the third fuel may be the same fuel or may be different fuels. In some embodiments (not shown), the fuel injection assembly 80 may only include a singular fuel supply conduit that supplies fuel to both the immersed injector 104 and the premix injector 100. As shown, the premix injector 100 extend radially between a radially outer end 175 and a radially inner end 177.

In exemplary embodiments, the premix injector 100 may include end walls 182 axially spaced apart from each other and side walls 184 extending between the end walls 182. For example, the side walls 184 extend axially between the end walls 182 along the axial direction A. The end walls 182 of the premix injector 100 may include a forward end wall and an aft end wall disposed oppositely from one another. The side walls 184 may be spaced apart from one another and may each extend axially between the forward end wall and the aft end wall. In many embodiments, one set of walls (e.g., the side walls 184) may be generally arcuate or curved, and the other set of walls (e.g., the end walls 182) may be generally straight. In some embodiments, as shown, the end walls 182 and the side walls 184 may collectively define a geometric stadium shaped area, i.e., a rectangle with rounded ends, that outlines and defines a perimeter of the opening 186. In other embodiments (not shown), the end walls 182 may be straight such that end walls 182 and the side walls 184 collectively define a rectangular shaped area.

An opening may be defined between the end walls 182 and the side walls 184 of the premix injector 100. In many embodiments, the premix opening 186 may be longer in the axial direction A than in the circumferential direction C, thereby advantageously allowing the opening 186 to introduce a large amount of fuel and air into the combustion chamber 70 without having the premix injector 100 impede a large portion of the annulus 47 through which it extends. For example, in various embodiments, the opening 186 may have a variety of cross-sectional shapes, such as but not limited to a rectangle, oval, stadium shape (e.g., a rectangle having arced or curved ends), or other suitable shapes. Although the premix injector 100 and the opening 186 are illustrated as having a geometric stadium shape, it should be understood that the premix injector 100 and its opening 186 may have a different shape (e.g., a round shape) or that the opening 186 may have a shape that is different from the outermost perimeter of the premix injector 100.

A plurality of ribs 178 may extend within the opening 186 of the premix injector 100 and may at least partially define a plurality of premix passages 180 each extending between an air inlet 174 disposed at the radially outer end 175 and an outlet 176 disposed at the radially inner end 177. For example, the plurality of ribs 178 may include at least one axial rib 179 extending along the axial direction A between the end walls 182 (e.g., from the forward end wall to the aft end wall). Additionally, or alternatively, the plurality of ribs 178 may include circumferential ribs 181 axially spaced apart from one another and each extending between the side walls 184. As shown in FIG. 4, the at least one axial rib 179 and one or more of the circumferential ribs 181 may couple to the immersed injector 104 (e.g., at a base 190 of the immersed injector 104). In many embodiments, the immersed injector 104 may be spaced apart from both the end walls 182 and the side walls 184 and may extend from within the opening 186 (e.g., from a center point of the opening 186). The plurality of ribs 178 may couple to, and at least partially support or suspend, the immersed injector 104 within the opening 186 (e.g., at the base 190 of the immersed injector 104).

Additionally, the immersed injector 104 may extend radially through the opening 186 (such as through a center point of the opening 186) of the premix injector 100 and directly into the combustion chamber 70. The immersed injector 104 may have a generally contoured aerodynamic shape (such as a teardrop shaped cross-section) in order to minimize disruption to flow of the combustion gases around the immersed injector 104 during operation of the combustor 17. For example, the immersed injector 104 may define an airfoil 188 extending radially from a base 190 at the radially inner end 177 to a tip 192. The entire airfoil 188 (e.g., from the base 190 to the tip 192) may be disposed within the secondary combustion zone 74. Additionally, the immersed injector 104 may include a leading edge 194, a trailing edge 196, and side surfaces 198 extending between the leading edge 194 and the trailing edge 196. In many embodiments, the leading edge 194 and the trailing edge 196 may face the end walls 192 (but be spaced apart therefrom), and the side surfaces 198 may generally face the side walls 184 (but be spaced apart therefrom). During operation of the immersed injector 104, the combustion gases may engage the airfoil 188 at the leading edge 194 and may travel along the side surfaces 198 to the trailing edge 196.

One or more fuel ports 199 may be defined on the side surface(s) 198 to inject pure fuel (such as hydrogen) directly into the combustion chamber 70. For example, the one or more fuel ports 199 may be in fluid communication with the third fuel supply 154. In this way, the immersed injector 104 may receive fuel from the third fuel supply 154 and may expel (or inject) the fuel into the secondary combustion zone via the fuel ports 199. In some embodiments, as shown in FIG. 3, the fuel ports 199 may be arranged in a row and may be generally aligned (e.g., along a common axis) on the side surface 198 of the airfoil 188. Contrary to both the fuel nozzles 40 and the premix injector 100, in exemplary embodiments, the immersed injector 104 does not introduce (or inject) a premix flow of air and fuel into the combustion chamber 70. Rather, the immersed injector 104 introduces pure fuel (such as pure hydrogen not mixed with air) into the combustion chamber 70, which advantageously allows the combustor 17 to operate on high amounts of total hydrogen.

In exemplary embodiments, the immersed injector 104 is surrounded by one or more premix passages 180 of the plurality of premix passages 180. For example, the immersed injector 104 may at least partially define a boundary of one or more of the premix passages 180, such that the premix passages 180 surrounding the immersed injector are collectively defined by the plurality of ribs 178, one of the side walls 184, and the immersed injector 104. Positioning the immersed injector 104 within the opening 186, and surrounded by one or more of the premix passages 180, advantageously allows the airfoil 188 to be cooled by the mixture 166 of air and fuel exiting the premix passages 180 of the premix injector 100.

Figure 5:
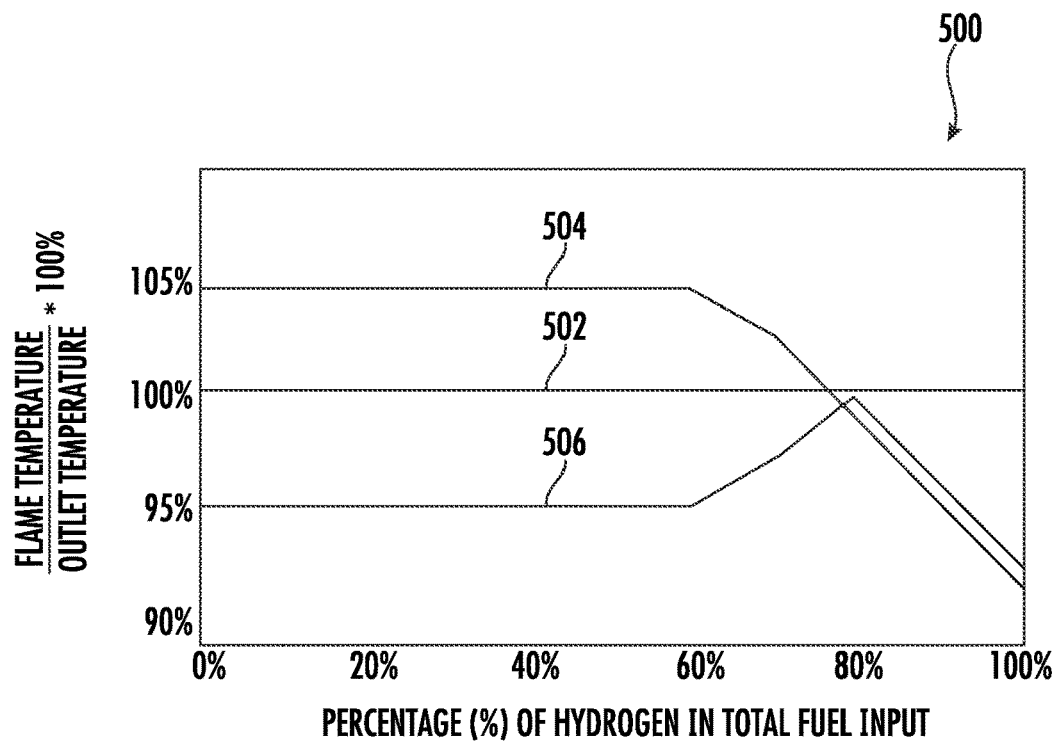
FIG. 5 illustrates a graph of flame temperature over outlet temperature vs. the percentage of hydrogen present in a total fuel input to a combustor, in accordance with embodiments of the present disclosure.

FIG. 5 is a graph 500 of flame temperature over outlet temperature (expressed as a percentage) vs. the percentage of hydrogen present in the total fuel input to the combustor 17, in which line 502 is the temperature of outlet combustion gases 172, line 504 is the temperature of the first flow of combustion gases 164 generated by the fuel nozzles 40, and line 506 is the temperature of the second flow of combustion gases 166 generated by the fuel injection assemblies 80 (i.e., the premix injectors 100 and the immersed injectors 104). The total fuel input may include all of the fuel that is supplied to the combustor 17 (including the fuel supplied to the fuel nozzles 40, the premix injectors 100, and the immersed injectors 104). The horizontal line 502 may be the outlet temperature of the outlet combustion gases 172 (e.g., the combustor exit temperature of the combustion gases). As shown by the horizontal line 502, the outlet temperature may be unchanged regardless of what percentage of the total fuel input consists of hydrogen. The line 504 may be the flame temperature at the outlet of the fuel nozzles 40 within the primary combustion zone 72, e.g., the flame temperature of the first flow of combustion gases 164. Additionally, the line 506 may be the flame temperature at the outlet of the premix injector 100 within the secondary combustion zone 74, e.g., the flame temperature of the second flow of combustion gases 166.

As shown, as the percentage of hydrogen present in the total fuel input supplied to the combustor increases above 80%, the flame temperature of the second flow of combustion gases 166 may increase above the flame temperature of the first flow of combustion gases 164, which advantageously allows the combustor to operate on high amounts of hydrogen without entering a flame holding or flashback condition.

In many embodiments, the outlet temperature of the outlet combustion gases 172 may be between about 2500° F. and about 3100° F. In other embodiments, the outlet temperature of the combustion gases 172 may be between about 2600° F. and about 2900° F. In some embodiments, the outlet temperature of the combustion gases 172 may be between about 2650° F. and about 2800° F.

Figure 6:
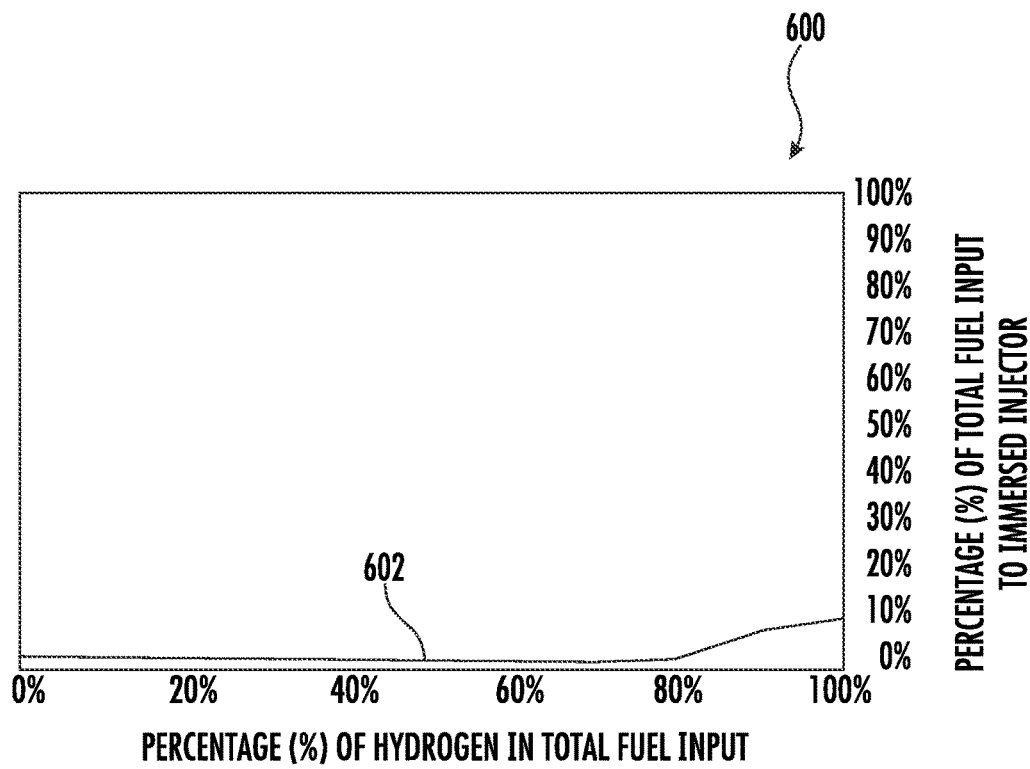
FIG. 6 is a graph of a percentage of total fuel input supplied to immersed injectors vs. the percentage of hydrogen present in the total fuel input to the combustor, in accordance with embodiments of the present disclosure.

FIG. 6 is a graph 600 of the percentage of total fuel input supplied to the immersed injectors 104 vs. the percentage of hydrogen present in the total fuel input to the combustor 17, in which the line 602 represents the amount of fuel supplied to the immersed injectors 104. As depicted, when the percentage of hydrogen in the total fuel input supplied to the combustor 17 is present at levels above 80%, the immersed injectors 104 may be supplied with fuel (e.g., hydrogen) unmixed with air or other oxidants. When operating on 100% hydrogen, about 10% of the total fuel input may be supplied to the immersed injectors 104. This advantageously allows the combustor 17 to maintain the required outlet temperature without causing the fuel nozzles 40 or the premix injectors 100 to enter flashback and/or flame holding conditions that could otherwise be caused by operating on high amounts of hydrogen.

Figure 7:
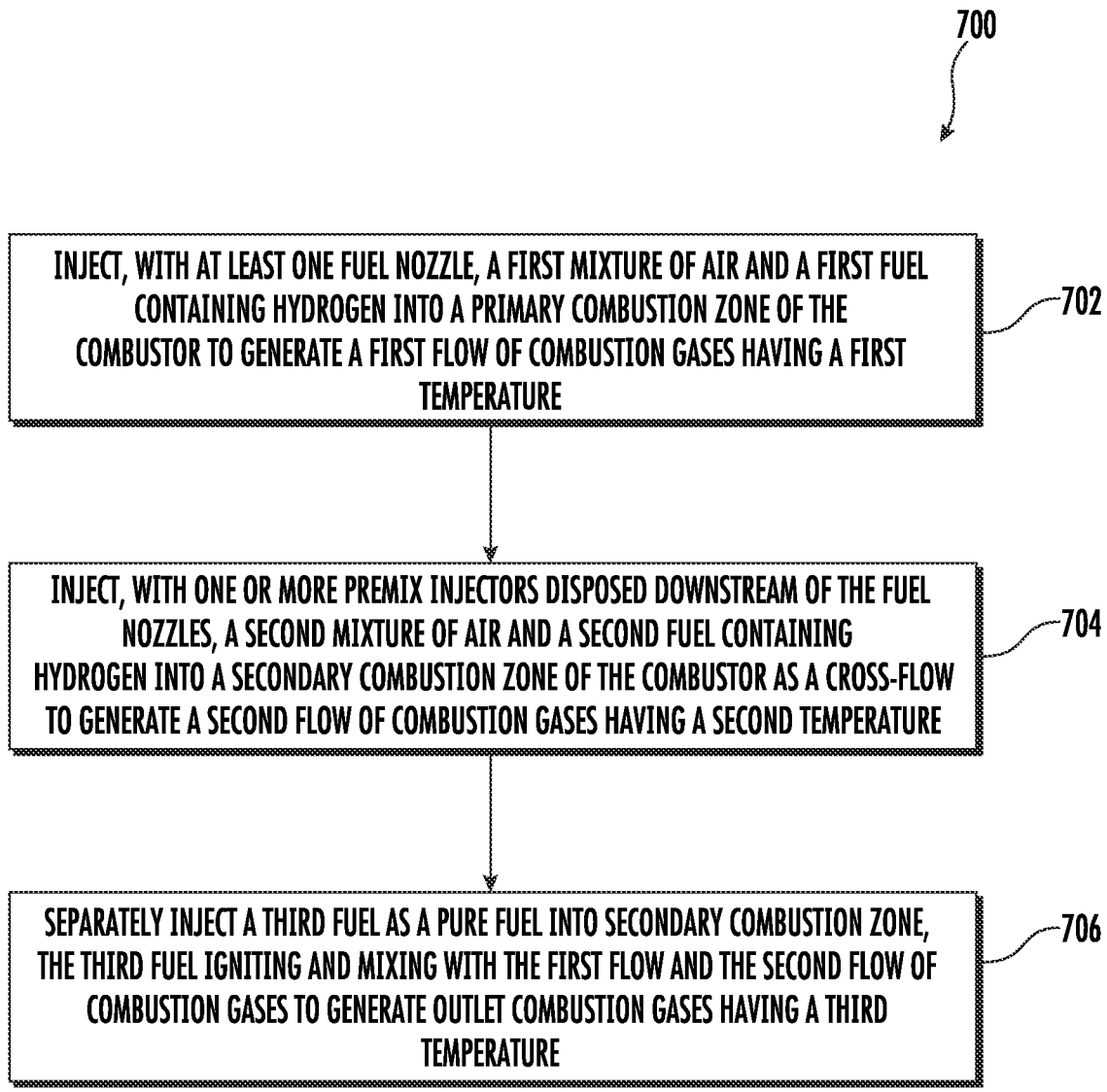
FIG. 7 is a flow diagram of a method of operating a combustor of a turbomachine on a total fuel input that contains a concentration of hydrogen that is greater than about 80% to generate outlet combustion gases having an outlet temperature, in accordance with embodiments of the present disclosure.

Referring now to FIG. 7, a flow diagram of one embodiment of a method 700 of operating a combustor 17 of a turbomachine 10 on a total fuel input that contains a concentration of hydrogen that is greater than about 80% to generate outlet combustion gases 172 having an outlet temperature is illustrated in accordance with aspects of the present subject matter. In general, the method 700 will be described herein with reference to the combustor 17, the bundled tube fuel nozzle 200, the fuel injection assembly 80, and the graphs 500, 600 described above and with reference to FIGS. 1 through 6. However, it should be understood that the method 700 may be utilized with any suitable combustor for a turbomachine without deviating from the scope of the present disclosure. Additionally, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, the method 700 may include a step 702 of injecting, with at least one fuel nozzle 40, a first mixture of air and a first fuel 158 containing hydrogen (e.g., diatomic hydrogen gas) into the primary combustion zone 72 of the combustor 17 to generate a first flow of combustion gases 164 having a first temperature. For example, the first mixture of compressed air 15 and the first fuel 158 may be delivered to the primary combustion zone 72 by the fuel nozzles 40 (which, in some embodiments, may be bundled tube fuel nozzles 200 in accordance with FIG. 3). In various embodiments the first fuel 158 may be a mixture of natural gas (such as methane, ethane, propane, or other natural gas) and hydrogen. In exemplary embodiments, the first fuel 158 may include a high concentration of hydrogen (such as greater than about 80% hydrogen), with the remainder of the first fuel 158 being one or more natural gases.

In exemplary embodiments, the method 700 may include a step 704 of injecting, with one or more premix injectors 100 disposed downstream of the fuel nozzles 40, a second mixture of air and a second fuel 160 containing hydrogen (e.g., diatomic hydrogen gas) into the secondary combustion zone 74 of the combustor 17 as a cross-flow to generate a second flow of combustion gases 164 having a second temperature. For example, the second mixture of compressed air 15 and the second fuel 158 may be delivered to the secondary combustion zone 74 by the premix injectors 100. In various embodiments, the second fuel 160 may be a mixture of natural gas (such as methane, ethane, propane, or other natural gas) and hydrogen (such as diatomic hydrogen gas). In exemplary embodiments, the second fuel 160 may include a high concentration of hydrogen (such as greater than about 80% hydrogen), with the remainder of the second fuel 160 being one or more natural gases.

In exemplary implementations of the method 700, the second temperature of the second flow of combustion gases 166 may be greater than the first temperature of the first flow of combustion gases 164. This may advantageously allow the combustor 17 to operate on a total fuel input that contains a concentration of hydrogen that is greater than 80% without experiencing flame holding and/or flashback conditions.

In many embodiments, the method 700 may further include a step 706 of separately injecting a third fuel 162 as a pure fuel (e.g., diatomic hydrogen gas) into secondary combustion zone 74. The third fuel 162 ignites and mixes with the first flow and the second flow of combustion gases 164, 166 to generate outlet combustion gases 172 (34 in FIG. 1) having a third temperature. In exemplary embodiments, the third temperature of the outlet combustion gases 172 may be greater than the first temperature of the first flow of combustion gases 164 (such as 10%, 20%, 30%, or 40%) greater, which advantageously allows the combustor 17 to operate on high amounts of hydrogen without entering potential flashback conditions. In some embodiments, the third temperature of the outlet combustion gases 172 may be generally equal to the outlet temperature of the combustor 17 (e.g., within ±5%). In various embodiments, the third fuel may be a fuel mixture, such as natural gas (e.g., methane, ethane, or propane) and hydrogen (e.g., diatomic hydrogen gas). For example, the third fuel may contain a high amount of hydrogen, such as 50%, 60%, 70%, 80%, 90%, or 100% hydrogen.

In many implementations, the step 706 may be performed by the immersed injector 104 described above with reference to FIGS. 2 and 4. For example, in contrast with the fuel nozzles 40 and the premix injector 100, which both deliver a mixture of fuel/air to the combustion chamber 70, the immersed injector 104 may advantageously deliver only fuel (e.g., not mixed with air) to the combustion chamber 70. The fuel may be a fuel mixture containing hydrogen and natural gas or may be only hydrogen not mixed with other fuels. In exemplary embodiments, as shown in FIGS. 2 and 4, the third fuel 162 may be injected at the axial location of the one or more premix injectors 100 into the secondary combustion zone 74. For example, the immersed injector 104 may extend through a center point of the premix injector 100.

Alternately, in other embodiments, the third fuel 162 may be injected downstream of the one or more premix injectors 100 into the secondary combustion zone 74. For example, the immersed injectors 104 may be entirely separated from the premix injectors 100 and may extend into the combustion chamber 70 downstream of the premix injectors 100.

In some implementations, the method 700 may include an optional step of increasing the concentration of hydrogen from about 80% to about 100% while maintaining the outlet temperature. In such a step, the combustor 17 may shift from operation on mostly hydrogen (with some natural gas mixed therein) to operation on entirely hydrogen (having no other fuels mixed therein). As a result of increasing the concentration of hydrogen from about 80% to about 100%, the first temperature of the first flow of combustion gases 164 may decrease and the second temperature of the second flow of combustion gases 166 may decrease while remaining equal to or above the first temperature.

In order to facilitate the transition from 80% to 100% hydrogen while maintaining the required outlet temperature and without creating a flame holding or flashback incident, as shown by FIG. 5, an amount of hydrogen supplied to the immersed injector 104 may be simultaneously increased to substitute for the loss of temperature in the first and second flow of combustion gases 164, 166. For example, when operating the combustor 17 when the concentration of hydrogen available in the fuel has been increased from about 80% to about 100% (while maintaining the outlet temperature), the method 700 may include simultaneously increasing an amount of the third fuel 162 (e.g., hydrogen) injected into the secondary combustion zone without air such that the third fuel 162 comprises up to about 10% of the total fuel input to the combustor 17.

In some embodiments, the method 700 may further include a step of mixing the first flow of combustion gases 164, the second flow of combustion gases 166, and the third flow of combustion gases 168 within the secondary combustion zone to generate the outlet combustion gases 172 having the outlet temperature. For example, the outlet temperature of the outlet combustion gases 172 may be between about 2500° F. and about 3100° F. In other embodiments, the outlet temperature of the combustion gases 172 may be between about 2600° F. and about 2900° F. In some embodiments, the outlet temperature of the combustion gases 172 may be between about 2650° F. and about 2800° F.

Figure 8:
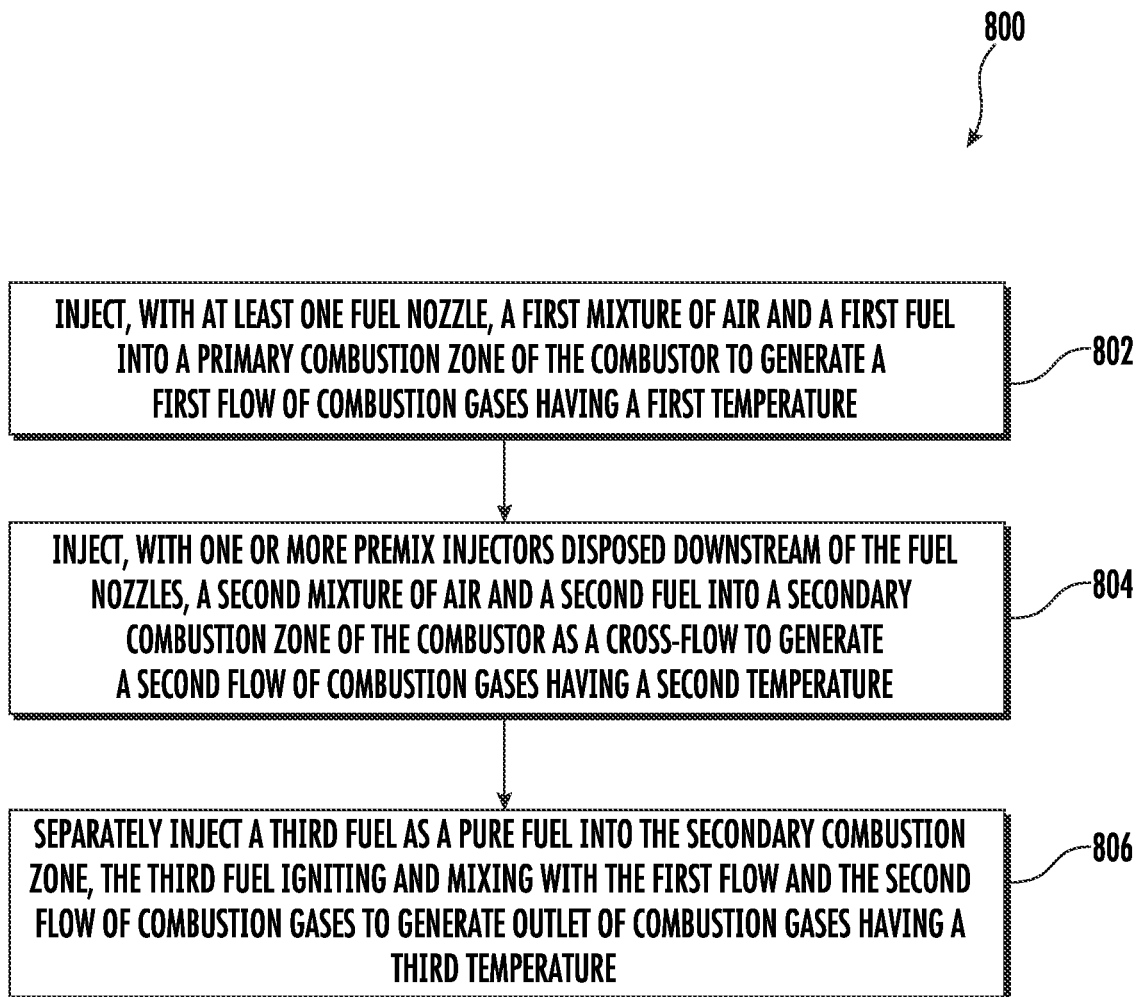
FIG. 8 is a flow diagram of a method of operating a combustor, in accordance with embodiments of the present disclosure.

Referring now to FIG. 8, a flow diagram of one embodiment of a method 800 of operating a combustor 17 is illustrated in accordance with aspects of the present subject matter. In general, the method 800 will be described herein with reference to the combustor 17, the bundled tube fuel nozzle 200, the fuel injection assembly 80, and the graphs 500, 600 described above and with reference to FIGS. 1 through 6. However, it should be understood that the method 800 may be utilized with any suitable combustor for a turbomachine without deviating from the scope of the present disclosure. Additionally, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

In many embodiments, the method 800 may include a step 802 of injecting, with at least one fuel nozzle 40, a first mixture of air and a first fuel 158 into a primary combustion zone 72 of the combustor 17 to generate a first flow of combustion gases 164 having a first temperature. For example, the first mixture of compressed air 15 and first fuel 158 (such as a fuel mixture containing natural gas and/or hydrogen, such as diatomic hydrogen gas) may be delivered to the primary combustion zone 72 by the fuel nozzles 40 (which, in some embodiments, may be bundled tube fuel nozzles 200 in accordance with FIG. 3).

The method 800 may further include a step 804 of injecting, with one or more premix injectors 100 disposed downstream of the fuel nozzles 40, a second mixture of air and a second fuel 160 into a secondary combustion zone 74 of the combustor as a cross-flow to generate a second flow of combustion gases 166 having a second temperature. Additionally, the method 800 may further include a step 806 of separately injecting a third fuel 162 as a pure fuel into secondary combustion zone, the third fuel igniting and mixing with the first flow and the second flow of combustion gases 164, 166 to generate outlet of combustion gases 172 having a third temperature.

Figure 9:
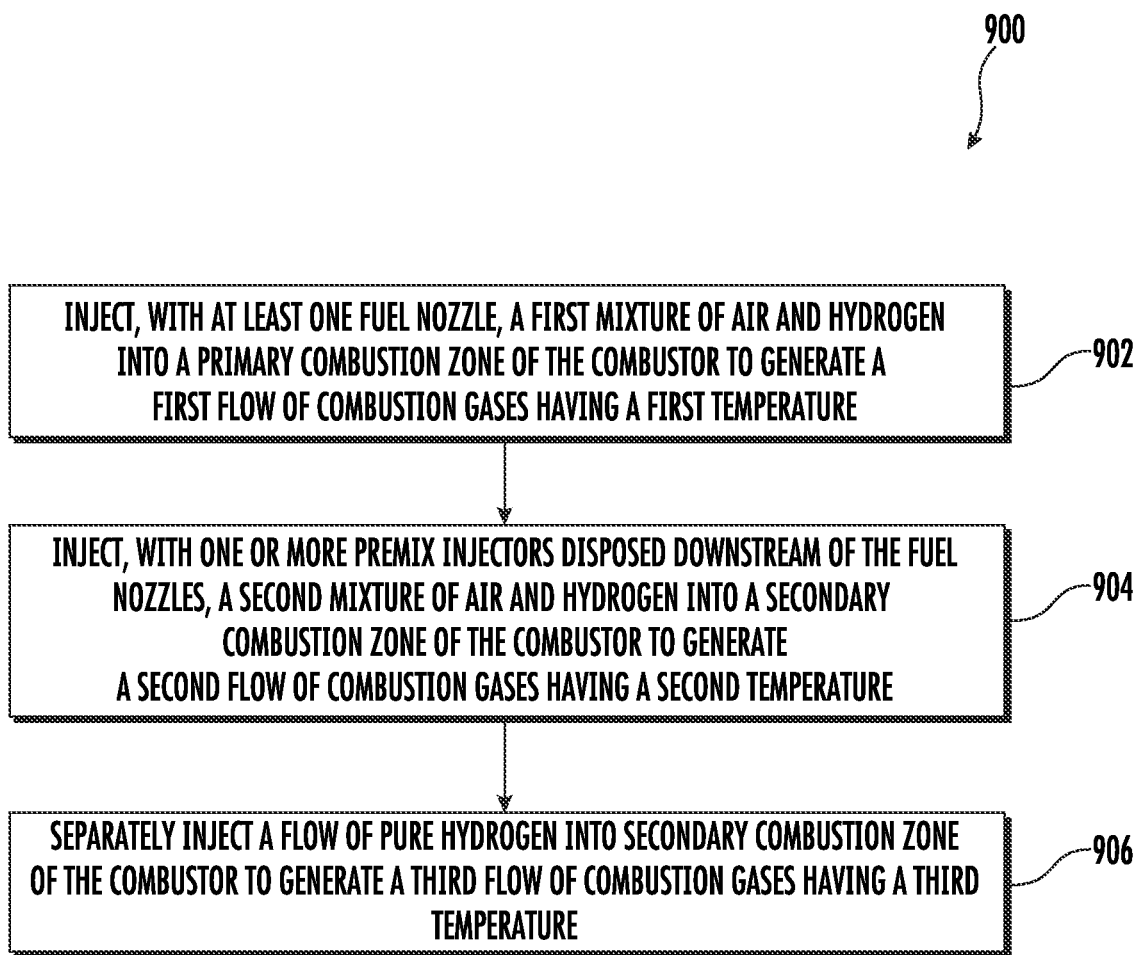
FIG. 9 is a flow diagram of a method of operating a combustor of a turbomachine on a total fuel input that contains a 100% concentration of hydrogen to generate outlet combustion gases having an outlet temperature, in accordance with embodiments of the present disclosure.

Referring now to FIG. 9, a flow diagram of one embodiment of a method 900 of operating a combustor 17 of a turbomachine on a total fuel input that contains a 100% concentration of hydrogen to generate outlet combustion gases 172 having an outlet temperature is illustrated in accordance with aspects of the present subject matter. In general, the method 900 will be described herein with reference to the combustor 17, the bundled tube fuel nozzle 200, the fuel injection assembly 80, and the graphs 500, 600 described above and with reference to FIGS. 1 through 6. However, it should be understood that the method 900 may be utilized with any suitable combustor for a turbomachine without deviating from the scope of the present disclosure. Additionally, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown, in exemplary embodiments, the method 900 may include a step 902 of injecting, with at least one fuel nozzle 40, a first mixture of air and hydrogen into the primary combustion zone 72 of the combustor 17 to generate a first flow of combustion gases 164 having a first temperature. For example, the first mixture of compressed air 15 and hydrogen may be delivered to the primary combustion zone 72 by the fuel nozzles 40 (which, in some embodiments, may be bundled tube fuel nozzles 200 in accordance with FIG. 3).

In many embodiments, the method 900 may include a step 904 of injecting, with one or more premix injectors 100 disposed downstream of the fuel nozzles 40, a second mixture of air and hydrogen into the secondary combustion zone 74 of the combustor 17 as a cross-flow to generate a second flow of combustion gases 166 having a second temperature. For example, the second mixture of compressed air 15 and hydrogen may be delivered to the secondary combustion zone 74 by the premix injectors 100.

In various embodiments, the method 900 may further include a step 906 of separately injecting a flow of pure hydrogen (e.g., not mixed with compressed air) into the combustion chamber 70 of the combustor 17 to generate a third flow of combustion gases 168 having a third temperature. In many implementations, the step 906 may be performed by the immersed injector 104 described above with reference to FIGS. 2 and 4. For example, contrary to both the fuel nozzles 40 and the premix injector 100, which both deliver a mixture of hydrogen and air to the combustion chamber 70, the immersed injector 104 may advantageously deliver only hydrogen (e.g., pure hydrogen not mixed with air) to the combustion chamber 70.

This written description uses examples to disclose the invention, including the best mode, and also to enable any person skilled in the art to practice the invention, including making and using any devices or systems and performing any incorporated methods. The patentable scope of the subject technology is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

Further aspects of the invention are provided by the subject matter of the following clauses:

A method of operating a combustor of a turbomachine on a total fuel input that contains a concentration of hydrogen that is greater than about 80%, the method comprising: injecting, with at least one fuel nozzle, a first mixture of air and a first fuel containing hydrogen into a primary combustion zone of the combustor to generate a first flow of combustion gases having a first temperature; injecting, with one or more premix injectors disposed downstream of the fuel nozzles, a second mixture of air and a second fuel containing hydrogen into a secondary combustion zone of the combustor as a cross-flow to generate a second flow of combustion gases having a second temperature; and separately injecting a third fuel as a pure fuel into secondary combustion zone, the third fuel igniting and mixing with the first flow and the second flow of combustion gases to generate outlet combustion gases having a third temperature.

The method as in one or more of these clauses, wherein the third temperature is greater than the first temperature.

The method as in one or more of these clauses, wherein the third fuel is injected at an axial location of the one or more premix injectors into the secondary combustion zone.

The method as in one or more of these clauses, wherein the third fuel is injected downstream of the one or more premix injectors into the secondary combustion zone.

The method as in one or more of these clauses, wherein separating injecting the third fuel as a pure fuel comprises injecting hydrogen gas in a concentration greater than 80% of the third fuel, the balance being natural gas.

The method as in one or more of these clauses, wherein the amount of the third fuel injected into the secondary combustion zone comprises up to about 10% of the total fuel input.

The method as in one or more of these clauses, further comprising mixing the first flow of combustion gases, the second flow of combustion gases, and the third flow of combustion gases within the secondary combustion zone to generate outlet combustion gases having an outlet temperature.

The method as in one or more of these clauses, wherein the combustor comprises an end cover, the at least one fuel nozzle extending from the end cover and at least partially surrounded by a combustion liner, the combustion liner extending from the at least one fuel nozzle toward an aft frame, wherein the combustion liner defines a combustion chamber that includes the primary combustion zone downstream extending from the at least one fuel nozzle to the one or more premix injectors and the secondary combustion zone extending downstream from the one or more premix injectors to the aft frame.

The method as in one or more of these clauses, wherein the total fuel input comprises greater than about 80% hydrogen with a remainder of the total fuel input being natural gas.

The method as in one or more of these clauses, wherein the first fuel and the second fuel further comprise natural gas.

The method as in one or more of these clauses, wherein the outlet temperature is between about 2500° F. and about 3100° F.

A method of operating a combustor: injecting, with at least one fuel nozzle, a first mixture of air and a first fuel into a primary combustion zone of the combustor to generate a first flow of combustion gases having a first temperature;

injecting, with one or more premix injectors disposed downstream of the fuel nozzles, a second mixture of air and a second fuel into a secondary combustion zone of the combustor as a cross-flow to generate a second flow of combustion gases having a second temperature; and separately injecting a third fuel as a pure fuel into the secondary combustion zone, the third fuel igniting and mixing with the first flow and the second flow of combustion gases to generate outlet combustion gases having a third temperature.

The method as in one or more of these clauses, wherein the third temperature is greater than the first temperature.

The method as in one or more of these clauses, wherein the third fuel is injected at an axial location of the one or more premix injectors into the secondary combustion zone.

The method as in one or more of these clauses, wherein the third fuel is injected downstream of the one or more premix injectors into the secondary combustion zone.

The method as in one or more of these clauses, further comprising mixing the first flow of combustion gases, the second flow of combustion gases, and the third flow of combustion gases within the secondary combustion zone to generate the outlet combustion gases having an outlet temperature of between about 2500° F. and about 3100° F.

A combustor of a turbomachine configured to operate on a total fuel input that contains at least 80% concentration of hydrogen, the combustor comprising: at least one fuel nozzle mounted to an end cover and configured to inject a first mixture of air and hydrogen into a primary combustion zone of the combustor; a combustion liner extending downstream from the at least one fuel nozzle to an aft frame; one or more premix injectors disposed downstream of the fuel nozzles, the one or more premix injectors coupled to the combustion liner and configured to inject a second mixture of air and hydrogen into a secondary combustion zone of the combustor; and one or more injectors configured to inject a flow of pure fuel into the secondary combustion zone of the combustor; wherein the at least one fuel nozzle generates a first flow of combustion gases having a first temperature, the one or more premix injectors generate a second flow of combustion gases having a second temperature greater than the first temperature, and the one or more injectors generate a third flow of combustion gases having a third temperature.

The combustor as in one or more of these clauses, wherein the one or more injectors are disposed at an axial location of the one or more premix injectors.

The combustor as in one or more of these clauses, wherein the one or more injectors inject pure hydrogen into the secondary combustion zone.

What is claimed is:

1. A method of operating a combustor of a turbomachine on a total fuel input that contains a concentration of hydrogen that is greater than about 80%, the method comprising:
   injecting, with at least one fuel nozzle, a first mixture of air and a first fuel containing hydrogen into a primary combustion zone of the combustor to generate a first flow of combustion gases having a first temperature;
   injecting, with one or more premix injectors disposed downstream of the fuel nozzles, a second mixture of air and a second fuel containing hydrogen into a secondary combustion zone of the combustor as a cross-flow to generate a second flow of combustion gases having a second temperature; and
   separately injecting a third fuel as a pure fuel into the secondary combustion zone, the third fuel igniting and mixing with the first flow and the second flow of combustion gases to generate outlet combustion gases having a third temperature.

2. The method as in claim 1, wherein the third temperature is greater than the first temperature.

3. The method as in claim 1, wherein the third fuel is injected at an axial location of the one or more premix injectors into the secondary combustion zone.

4. The method as in claim 1, wherein the third fuel is injected downstream of the one or more premix injectors into the secondary combustion zone.

5. The method as in claim 1, wherein separately injecting the third fuel as a pure fuel comprises injecting hydrogen gas in a concentration greater than 80% of the third fuel, the balance being natural gas.

6. The method as in claim 5, wherein the amount of the third fuel injected into the secondary combustion zone comprises up to about 10% of the total fuel input.

7. The method as in claim 1, further comprising mixing the first flow of combustion gases, the second flow of combustion gases, and the third flow of combustion gases within the secondary combustion zone to generate outlet combustion gases having an outlet temperature.

8. The method as in claim 1, wherein the combustor comprises an end cover, the at least one fuel nozzle extending from the end cover and at least partially surrounded by a combustion liner, the combustion liner extending from the at least one fuel nozzle toward an aft frame, wherein the combustion liner defines a combustion chamber that includes the primary combustion zone downstream extending from the at least one fuel nozzle to the one or more premix injectors and the secondary combustion zone extending downstream from the one or more premix injectors to the aft frame.

9. The method as in claim 1, wherein the total fuel input comprises greater than about 80% hydrogen with a remainder of the total fuel input being natural gas.

10. The method as in claim 1, wherein the first fuel and the second fuel further comprise natural gas.

11. The method as in claim 9, wherein the outlet temperature is between about 2500° F. and about 3100° F.

12. A method of operating a combustor:
   injecting, with at least one fuel nozzle, a first mixture of air and a first fuel into a primary combustion zone of the combustor to generate a first flow of combustion gases having a first temperature;
   injecting, with one or more premix injectors disposed downstream of the fuel nozzles, a second mixture of air and a second fuel into a secondary combustion zone of the combustor as a cross-flow to generate a second flow of combustion gases having a second temperature; and
   separately injecting a third fuel as a pure fuel into the secondary combustion zone, the third fuel igniting and mixing with the first flow and the second flow of combustion gases to generate outlet combustion gases having a third temperature.

13. The method as in claim 12, wherein the third temperature is greater than the first temperature.

14. The method as in claim 12, wherein the third fuel is injected at an axial location of the one or more premix injectors into the secondary combustion zone.

15. The method as in claim 12, wherein the third fuel is injected downstream of the one or more premix injectors into the secondary combustion zone.

16. The method as in claim 12, further comprising mixing the first flow of combustion gases, the second flow of combustion gases, and the third flow of combustion gases within the secondary combustion zone to generate the outlet combustion gases having an outlet temperature of between about 2500° F. and about 3100° F.

17. A combustor of a turbomachine configured to operate on a total fuel input that contains at least 80% concentration of hydrogen, the combustor comprising:
- at least one fuel nozzle mounted to an end cover and configured to inject a first mixture of air and hydrogen into a primary combustion zone of the combustor;
- a combustion liner extending downstream from the at least one fuel nozzle to an aft frame;
- one or more premix injectors disposed downstream of the fuel nozzles, the one or more premix injectors coupled to the combustion liner and configured to inject a second mixture of air and hydrogen into a secondary combustion zone of the combustor; and
- one or more injectors configured to inject a flow of pure fuel into the secondary combustion zone of the combustor;
- wherein the at least one fuel nozzle generates a first flow of combustion gases having a first temperature, the one or more premix injectors generate a second flow of combustion gases having a second temperature greater than the first temperature, and the one or more injectors generate a third flow of combustion gases having a third temperature.

18. The combustor as in claim 17, wherein the one or more injectors are disposed at an axial location of the one or more premix injectors.

19. The combustor as in claim 17, wherein the one or more injectors inject pure hydrogen into the secondary combustion zone.

\* \* \* \* \*